United States Patent
Zhang et al.

(10) Patent No.: US 8,750,664 B2
(45) Date of Patent: Jun. 10, 2014

(54) BEND INSENSITIVE SINGLE MODE FIBER

(75) Inventors: Liyong Zhang, Zhejiang (CN); Weimin Lu, Zhejiang (CN); Haigang Wu, Zhejiang (CN); Qunxing Li, Zhejiang (CN); Xiaopeng Huang, Zhejiang (CN)

(73) Assignee: Futong Group Co., Ltd., Fuyang, Zhejiang (CN)

( * ) Notice: Subject to any disclaimer, the term of this patent is extended or adjusted under 35 U.S.C. 154(b) by 591 days.

(21) Appl. No.: 13/059,971

(22) PCT Filed: Jul. 3, 2009

(86) PCT No.: PCT/CN2009/072607
§ 371 (c)(1),
(2), (4) Date: Feb. 19, 2011

(87) PCT Pub. No.: WO2010/020139
PCT Pub. Date: Feb. 25, 2010

(65) Prior Publication Data
US 2011/0142404 A1 Jun. 16, 2011

(30) Foreign Application Priority Data
Aug. 20, 2008 (CN) .......................... 2008 1 0120563

(51) Int. Cl.
*G02B 6/02* (2006.01)
*G02B 6/036* (2006.01)

(52) U.S. Cl.
USPC ............ 385/127; 385/123; 385/126; 385/128

(58) Field of Classification Search
None
See application file for complete search history.

(56) References Cited

U.S. PATENT DOCUMENTS 6,317,549 B1 * 11/2001 Brown .......................... 385/123
6,449,415 B1    9/2002 Sasaoka
(Continued)

FOREIGN PATENT DOCUMENTS

CN    1971321 A    5/2007
CN    2927080 Y    7/2007
(Continued)

OTHER PUBLICATIONS

International Search Report for PCT/CN2009/072607.

*Primary Examiner* — Uyen Chau N Le
*Assistant Examiner* — Chad Smith
(74) *Attorney, Agent, or Firm* — Global IP Services; Tianhua Gu

(57) ABSTRACT

This invention discloses a bend insensitive single mode fiber, which is composed by a bare glass fiber with a round cross section and two resin protective layers with circular cross sections surrounding the outer of the bare glass fiber. It is characterized in that the bare glass fiber is composed by a core layer with a round cross section and two claddings with circular cross sections. The refractive index of the core layer is higher than the index of the two claddings and the refractive index difference between the core layer and the first cladding is larger than the difference between the first and second claddings. The second cladding is made of pure $SiO_2$. The refractive index profile of the core layer follows a power function, and the refractive index profile of the two claddings follow a ladder-type distribution. The loss of the invented fiber is insensitive to the bending of the fiber, which meets the requirements of ITU.T G.657.A and G.657.B standards, respectively. It is applicable to the Fiber To The Home (FTTH) and other local area network and the access network systems.

5 Claims, 9 Drawing Sheets

(56) References Cited

U.S. PATENT DOCUMENTS

| | | |
|---|---|---|
| 6,904,281 B2 | 6/2005 | Park et al. |
| 7,046,884 B2 * | 5/2006 | Sasaoka et al. ............... 385/123 |
| 7,181,118 B2 * | 2/2007 | Rosenblum et al. .......... 385/127 |
| 2003/0231847 A1 * | 12/2003 | Varner et al. .................. 385/127 |
| 2004/0252956 A1 * | 12/2004 | Kalish et al. .................. 385/127 |
| 2006/0008221 A1 * | 1/2006 | Takahashi et al. ............ 385/124 |
| 2007/0077016 A1 | 4/2007 | Bickham et al. |
| 2008/0013901 A1 | 1/2008 | Kim et al. |

FOREIGN PATENT DOCUMENTS

| | | | | |
|---|---|---|---|---|
| CN | 101373238 A | | 2/2009 | |
| CN | 201247332 Y | | 5/2009 | |
| EP | 283748 A1 * | 9/1988 | ............... | G02B 6/22 |
| EP | 368014 A1 * | 5/1990 | ............... | G02B 6/22 |
| GB | 2125180 A * | 2/1984 | ............... | G02B 5/14 |
| JP | 59178404 A * | 10/1984 | ............... | G02B 5/14 |
| JP | 62052509 A * | 3/1987 | ............... | G02B 6/22 |

* cited by examiner

BEND INSENSITIVE SINGLE MODE FIBER

CROSS REFERENCE TO RELATED PATENT APPLICATION

The present application is the US national stage of PCT/CN2009/072607 filed on Jul. 3, 2009, which claims the priority of the Chinese patent application No. 200810120563.9 filed on Aug. 20, 2008, which application is incorporated herein by reference.

FIELD OF THE INVENTION

The present invention relates to a kind of fiber, and more particularly to a single mode fiber that meets the ITU.T G.657 fiber standard, is insensitive to the bending loss and is applicable to the local area network and the access network systems such as Fiber To The Home (FTTH).

BACKGROUND OF THE INVENTION

As the extension of the broadband services to the family, the focus of the construction of the communication optical network is developing from the core network to the optical fiber local area network, access network and even the Fiber To The Home (FTTH). FTTH, as the last mile of the access network, is affected by the complex applications (mostly the streets, buildings, corners, etc.). Moreover, since it has many access points and it is affected by the hanging, pulling, bending and other factors in the wire arrangement, the fiber has lots of bending phenomenon, which proposes a higher demand on the bending performance of the fiber. The mode field diameter of the conventional G.652 fiber is about 9.2 μm. Due to the influence of the bending loss and the mechanical stress, it is generally required that the bending radius of the fiber in the use shall be not less than 30 mm, which is hard to wiring along the indoor walls and coil the remaining length of the fiber like the copper wire. The popularity of the FTTH needs to further improve the operating performance of the fiber and make the miniaturization of the indoor devices and the junction box. Therefore, the bending insensitive fiber will become the focus of the fiber application in the future.

The International Telecommunication Union (ITU) officially introduced the specifications and standards of the bending insensitive fiber cable in December, 2006 and defined such fiber cable as G.657 fiber cable. The G.657 fiber cable is mainly characterized in the fiber can be equipped with a smaller bending diameter and is of lower bending loss and able to better meet the construction requirements of FTTH project. Compared with the conventional single mode fiber (C-SMF), G.657 fiber has better bending performance to ensure the fiber's access to the network, including the various kinds of wiring in the constructions of the fiber access network terminal. According to the operating wavelength and the use scope, G.657 fiber can be divided into two types: G.657A and G.657B. G.657A is characterized in, under the premise of fully meeting the specifications of G.652D, improving the bending loss feature of the fiber, which can work in the entire operating wavelength range of 1260-1625 nm. G.657A fiber can be regarded as a subclass of G.652D, with the transmission and interconnecting performance the same as G.652D. However, G.657A fiber has better bending performance and more accurate geometry requirements. G.657 B is characterized in the overall improvement of the bending loss feature of the fiber. Due to primary usage in buildings, it is not necessary to meet the specifications of G.652D. The transmission operating wavelengths of G.657B fiber are respectively 1310 nm, 1550 nm and 1.625 nm. Due to the smaller mode field diameter, G.657B fiber is also different from G.652 in respect of the splicing and connection features. But G.657B fiber can work normally in the circumstance that the bending radius is very small.

In fact, the bend insensitive fiber is always one of the important parts of the development and research of the fiber materials. In the 80s of last century, AT&T in the United States and NTT in Japan respectively introduced the depress cladding and convex refractive index fiber, the cut-off wavelength of which operated at 1.3 μm can be made up to 1.35 μm. Through decades of efforts, today many companies have already launched the bend insensitive fibers which the bend insensitive performance has been improved greatly. For example, FutureGuide-SR15 and FutureGuide-SR15E bend insensitive fiber of Fujikura Ltd. respectively correspond to ITU-T G.652.B fiber and ITU-T G.652.D fiber, the minimum allowable bending radiuses of which are up to 15 mm, which has been reduced by half by comparing with 30 mm bending radius of the conventional single mode fiber. The minimum allowable bending radius of PureAccess-Ultra fiber introduced by Sumitomo Electric has been reduced from the conventional 30 mm to 7.5 mm. For the bend insensitive fiber of Corning, when the bending radius is 32 mm, its loss at 1550 nm is not more than 1 dB and the corresponding cut-off wavelength is between 870 nm-970 nm. The loss of the bend insensitive fiber of FiberHome at 1550 nm is not more than 0.5 dB and the corresponding cut-off wavelength is below 1290 nm under the bending radius of 10 mm and 30 turns.

The improvement of the bending performance of the fiber can be started from the improvement of the fiber structure. For example, for the hole assisted bending insensitive fiber of Fujikura (China Patent Application No.: 200580022430.2, Publication No.: CN1981223A), the bending loss with the 5 mm bending radius at 1550 nm wavelength is 0.012 dB/turn, the mode field diameter (1550 nm) is 7.8 μm and the cut-off wavelength is 1.28 μm. Although the mode field diameter of the fiber is slightly smaller than C-SMF, the attenuation of the fiber can also reach the level of C-SMF when making the hole assisted fiber matching with the C-SMF cross section through the electric arc so that the average splice loss can be up to 0.05 dB. And the attenuations at 1.30 μm and 1.55 μm are 0.50 dB/km and 0.28 dB/km. A kind of air hole assisted fiber (Application No.: 200610119574.6, Publication No.: CN1971323A) has been also disclosed. The trench assisted BendBright$^{XS}$ fiber of Drake does not only meets G.657A standard (completely compatible with G.652D) but also meets G.657B standard (the bending loss is smaller). The minimum bending radius is between 1-10 mm. Moreover, the average splicing loss is smaller than 0.05 dB when using a suitable procedure splicing with C-SMF. ClearCurve™ fiber, a new bending insensitive fiber based on the nanoStructures™ technology launched by Corning in the United States, is not only completely compatible with G.652D, but also the bending insensitive property is 10 times higher than the specified value of G.657B. The European patent application (Application No.: 89104889.4 and Publication No.: 0 334 247 A2) discloses a kind of depressed cladding step refractive index profile fiber, the mode field diameters of which are respectively about 6 μm and 8 μm. The invention with the international patent application number of PCT/US2006/035894 and the publication number of WO 2007/040947 A1 presents a kind of bend insensitive fiber with the parabolic refractive index distribution. The American patent with the application number of US2008/0056654 A1 relates to a kind of three-cladding bend insensitive fiber with depressed refractive index of second cladding. The Chinese patent application with the application number of 200610051922.0 and the publication number of CN1971321A relates to a kind of ultra low water peak bend insensitive fiber.

The improvement of the bending performance of the fiber can also be started from the improvement of the coating resin layer of the fiber. For example, the Chinese patent application with the application number of 03124078.x and the publication number of CN1542473A has proposed a kind of fiber with special resin layer which has a high bending modulus. Another example, the coating process of Drake's Color-Lock™ also enhances the microbending performance and reliability of the fiber.

The various prior arts have improved the bending performance of the fiber by improving the fiber structure, the fiber refractive index profile, the fiber coating resin layer and other different methods. However, fibers manufactured by using many of the methods as mentioned above are difficult to meet the requirements of the transmission performance specified in ITU.T G657. For some fibers that can meet the transmission requirements, the structures are relatively complex and the processes are very difficult and the manufacturing cost is very high. The problem to be solved by this invention is to find a new bending insensitive single mode fiber that has a relatively simple structure, relatively easy process and, at the same time, is also able to meet the standards of G.657 series of fiber proposed by the international ITU.T organization.

SUMMARY OF THE INVENTION

The technical problems to be solved and the technical tasks to be proposed in this invention is to overcome the contradiction that the loss of the fiber with prior arts is relatively sensitive to the bending of the fiber leading to fail to meet the complex construction requirements of the FTTH local area network. Through the special design of the fiber structure, the invention is providing a single mode fiber, which is of simple structure and easy to produce and the loss of which is insensitive to the bending, the allowable minimum bending radius of which can be up to 7.5 mm and which can meet the requirements of ITU.T G657 series and be able to be used in the local area network and the access network for transmission. Therefore, the main contents and the technical programs of the invention are as follows:

The bend insensitive single mode fiber is composed by a bare glass fiber with a round cross section and two resin protective layers with circular cross sections surrounding the outer of the bare glass fiber. It is characterized in that the bare glass fiber is composed by a core layer and two claddings. The refractive index of the core layer is higher than the index of the two claddings and the refractive index difference between the core layer and the first cladding is larger than the difference between the first and second claddings. The second cladding is made of pure $SiO_2$. The refractive index profile of the core layer follows a power function, and the refractive index profiles of the two claddings follows a ladder-type distribution.

As a further improvement and supplement of the above technical program, the invention also includes the following additional technical characteristics.

The refractive index difference of the core layer and the first cladding is between 0.0033~0.0072; the difference of the first and second claddings is between −0.0016~0. The thickness of the core layer, first cladding and second cladding is 2.7~4.1 µm, 0.5~2.3 µm and 56.7~59.8 µm respectively.

Or, the refractive index difference ($\Delta_1$) of the core layer and the first cladding is between 0.00340~0045; the refractive index difference ($\Delta_2$) of the first and second claddings is between −0.0006~0. The thickness of the core layer, first cladding and second cladding are 3.5~4.0 µm, 0.5~1.9 µm and 56.6~58.5 µm respectively. At the moment, for the finished fiber, the mode field diameter (MFD) is 8.6±0.4 µm at the wavelength of 1310 nm and the cutoff wavelength ($\lambda_c$) is between 1180~1330 nm. When measured by winding ten turns with the radius of 15 mm, the macro-bending loss of the finished fiber is less than 0.25 dB at 1550 nm, and the macro-bending loss is less than 1.0 dB at 1625 nm. When measured by winding one turn with the radius of 10 mm, the macro-bending loss of the finished fiber is less than 0.75 dB at 1550 nm and the macro-bending loss is less than 1.5 dB at 1625 nm.

Or, the refractive index difference ($\Delta_1$) of the core layer and the first cladding is between 0.0058~0.0072; the refractive index difference ($\Delta_2$) of the first and second claddings are between −0.0016~0.0008. The thickness of the core layer, first cladding and second cladding are 2.8~3.2 µm, 0.8~2.1 µm and 57.1~58.9 µm respectively. At the moment, for the finished fiber, the mode field diameter (MFD) is 6.5±0.5 µm at the wavelength of 1310 nm and the cutoff wavelength ($\lambda_c$) is between 1180~1330 nm. When measured by winding ten turns with the radius of 15 mm, the macro-bending loss of the finished fiber is less than 0.03 dB at 1550 nm, and the macro-bending loss is less than 0.1 dB at 1625 nm. When measured by winding one turn with the radius of 10 mm, the macro-bending loss of the finished fiber is less than 0.1 dB at 1550 nm, and the macro-bending loss is less than 0.2 dB at 1625 nm. When measured by winding one turn with the radius of 7.5 mm, the macro-bending loss of the finished fiber is less than 0.5 dB at 1550 nm, and the macro-bending loss is less than 1.0 dB at 1625 nm.

The diameter of the bare glass fiber is between 124.3125.7 µm. For the first resin protective layer, the thickness is 38±1 µm, the Young's modulus is 1.1±0.1 MPa and the elastic modulus is 1.6±0.1 MPa. For the second resin protective layer (13), the thickness is 22±1 µm, the Young's modulus is 700±50 MPa and the elastic modulus is 1200±100 MPa. The diameter of the finished fiber is 242±7 µm.

The power exponent of the distributed power function of the refractive index profile of the core layer near the center part and near the first cladding part are 3~5 and −9~−8 respectively. For the single mode fiber of the invention, the core layer of the bare glass fiber can be made of the doped quartz glass; the cladding of the bare glass fiber can be made of the quartz glass and the inner and outer resin protective layers can be made of the resin. The core layer and cladding of the bare glass fiber have unique structures. The core layer of the fiber is the area where is doped with Ge or P or other chemical elements that can increase the refractive index and where the refractive index is relatively high. The first cladding is a pure $SiO_2$ layer or the area where is doped with F or B or other chemical elements that can reduce the refractive index. The second cladding, the outer cladding of the fiber, is a pure $SiO_2$ layer. The outer diameter of the bare glass fiber is 125±1 µm. (The sum of the core layer and the first and second claddings is the outer diameter of the bare glass fiber. In the manufacturing, the diameter of the second cladding is adjusted to ensure the sum of the three layers (the dimension of the bare glass fiber). The diameter of the finished fiber is 242±7 µm.

When manufacturing the fiber, the components of each layer are firstly determined according to the designed refractive index profile including the refractive index and the thickness of the core layer, the refractive index and the thickness of the first cladding, the thickness of the second cladding and other parameters; and then, the preform core rod that meets the design requirements is manufactured by the Modified Chemical Vapor Deposition Process (MCVD) (or the Plasma Chemical Vapor Deposition Process (PCVD), or the Outside Vapor Deposition Process (OVD), or the Vapor-axial Deposition (VAD), etc.); and the two claddings surrounding outside the core rod are manufactured by the OVD (or the VAD, MCVD, PCVD, Rod In Cylinder (RIC) or other methods); finally, the fiber perform is drawn into the bare glass fiber on the drawing tower, following twice of the UV-curable resin coating; at last, after a series of mechanical, optical and chemical screening, a finished single mode fiber is born by reeling.

The beneficial effect of the invention is to realize, through the reasonable design of the core layer and the cladding, the bend insensitive single mode fiber that is feasible in technology, of relatively relaxed manufacturing tolerances, relatively low manufacturing costs and able to fully meet today's relevant G.657 fiber standard and applicable to the local area networks and access networks such as FTTH, etc.

With the further promotion of the optical fiber communication services, especially the implementation of the Fiber To The Home and other projects, the bending resistance of the fiber has been appreciated more and more widely. It is one of the important indexes for the study of the fiber performance today and in the future. The improvement of the bending performance of the fiber can be started from the structure, components and coating resin layer of the fiber. The invention has a critical design on the core layer of the fiber from two aspects: the structure and components of the fiber, so that the refractive index profile of core layer of the fiber can be distributed as the power function. And a certain extent of the refractive index dip in the first cladding is introduced ($\Delta_2$ is between $-0.0016 \sim 0$), which therefore reduces the bending sensitivity of the fiber of the invention and obtains the excellent bending insensitivity.

The known studies have shown that both the macrobending loss and the microbending loss will increase with the increase of the MAC value of the fiber. The MAC value is the ratio of the mode field diameter (MFD) and the cutoff wavelength ($\lambda_c$), which is defined as Formula (I):

$$MAC = MFD/\lambda_c \quad (1)$$

According to this, through the special design of the dimensions and the refractive index distribution of the core layer and the cladding of the bare glass fiber, the invention reduces the fiber MFD and increases the fiber $\lambda_c$, and thus achieves the improvement of the fiber bending loss insensitivity.

The fiber of the invention has the unique refractive index profile, the waveguide performance and the bending insensitivity: the MAC value is not more than 7.5; the zero dispersion wavelength is between 1180-1330 nm; the zero dispersion slope is not more than 0.092 ps/(nm2·km); the cutoff wavelength is between 1200-1400 nm. Compared with G.652 fiber, the bending sensitivity has been greatly reduced. The allowable fiber bending radius can be reduced from 30 mm to 10 mm, and even to 7.5 mm, which thus reduces the difficulty and cost of the construction of the local area network and the access network.

DETAIL DESCRIPTION OF THE INVENTION

Figure 1A:
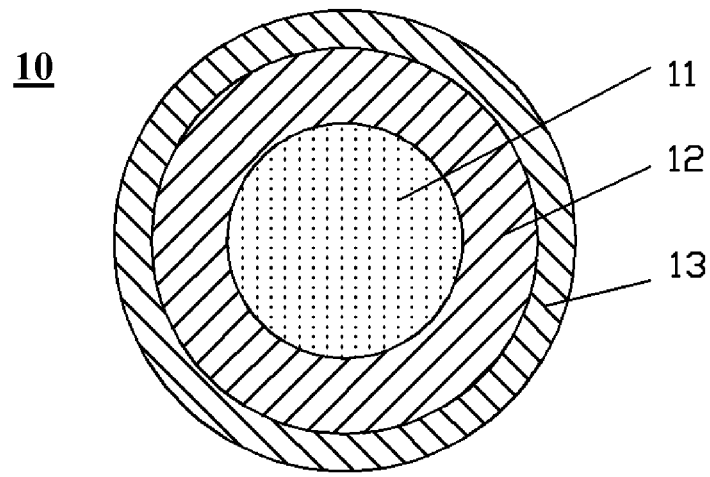
FIGS. 1A and 1B are respectively the cross-sectional schematics of the single mode fiber (10) and bare glass fiber (11) of the invention.
Figure 1B:
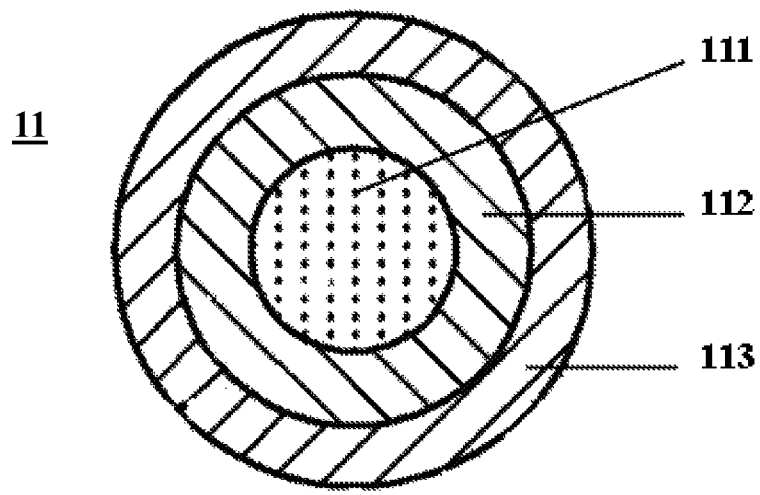

As shown in FIG. 1A, the single mode fiber, which is also the finished fiber, is defined as 10. The structure is composed by the bare glass fiber 11 with a circular section arranged in the center of the single mode fiber 10 and the first resin protective layer 12 and the second resin protective layer 13 that are in turn surrounding by the external of the single mode fiber 11 with circular sections, both of which are made of the polyacrylic acid resin and can be made by the ultraviolet curing or other curing methods. As shown in FIG. 1B, the bare glass fiber 11 includes the core layer 111 with a circular section, the first cladding 112 with the depressed refractive index and a circular section and the second cladding 113 is made of the pure $SiO_2$ with a circular section. The second cladding 113 can also be known as the external cladding.

Figure 2:
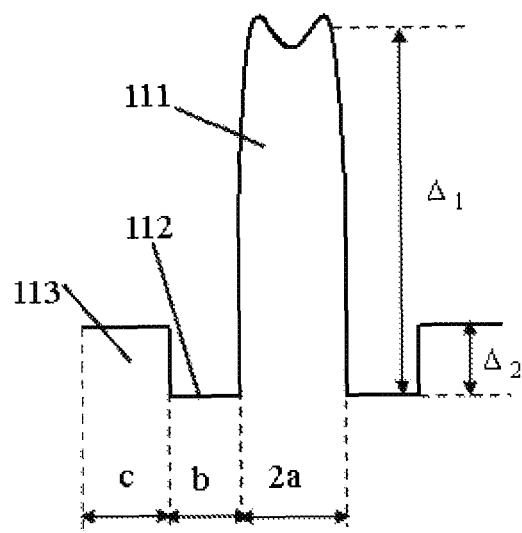
FIG. 2 is the structure diagram of the refractive index profile of the bare glass fiber (11) in FIG. 1.

The invention can adopt the VAD process (it can be replaced by the PCVD, OVD, MCVD or other similar methods) to produce the fiber perform core rod with the refractive index profile as shown in FIG. 2. And then adopt the OVD technology (it can be replaced by the PCVD, VAD, MCVD or other similar methods) to produce the external cladding with the pure $SiO_2$, or use the RIC technology to have an external cladding surround the core rod and thus produce the fiber perform. The specific process is as follows:

Use the method of combining the VAD (or PCVD, MCVD, OVD, etc.) and the OVD (or PCVD, MCVD, OVD, etc.) to produce the fiber perform: In the VAD and other core rod manufacturing process, apply $GeCl_4$ in the $SiCl_4$ raw material in the core burner to appropriately increase the refractive index difference $\Delta_1$ of the core layer 111 and control the deposition size (specifically the thickness b) of the core layer 112 through regulating the deposition time, raw material flow and other parameters; stop supplying $GeCl_4$ and continue to deposit the layer with the pure $SiCl_4$ so as to produce part of the thickness of the second cladding 113; and control the deposition size of the first cladding 113 through regulating the deposition time, raw material flow and other parameters; in the step of deposition, the thickness of the second cladding 113 is not less than 4.5 times of the sum of a and b so as to obtain the core rod. And then, calculate another part of the thickness of the third cladding 113 of the fiber according to the above obtained core rod size; and use the OVD and other cladding technologies to deposit a layer of $SiO_2$ particles on the outer surrounding of the core rod with $SiCl_4$ as the raw material and then sinter in the furnace into a transparent glass body, that is the fiber perform.

The process of manufacturing the fiber perform by the combination of the VAD (or PCVD, MCVD, OVD, etc.) and the RIC is: calculate the size of the needed core rod according to the size of the selected cylinder and calculate the geometric size and refractive index of each layer in the refractive index profile of the core rod; use the same methods of the above VAD and others to produce the core rod; clean the outer surface of the core rod and the inner surface of the cylinder with a certain concentration (e.g. 35%) of hydrofluoric acid (or other alternative chemical reagents); machining 2-4 gas leading slot on one end of the core rod with the cutting machine and insert the core rod into the matching cylinder; both ends of the cylinder with core rod connect to the quartz tail tube and then place it on the MCVD or PCVD lathe to heat so that the cylinder collapse to the core rod and become a fiber perform. The interface between the cylinder and the core rod shall be kept with the negative pressure in the collapsing and the air inside will be discharged through the gas leading slot of one end of the core rod.

Use the fiber perform produced by the above different processes to draw into fiber on the drawing tower and, at the same time, coat two layers of the polyacrylic resin with different hardness to form the first resin protective layer 12 and second resin protective layer 13, and the single mode fiber 10 is produced.

As shown in FIG. 1, in the invention, G.657 fiber with such kind of structure requires that the refractive index difference $\Delta_1$ of the core layer 111 is among 0.0033-0.0072 and the allowable tolerance is ±2.3%. The thickness a of the core layer 111 is among 2.7-4.1 μm and the allowable error is ±3.3%. The refractive index difference $\Delta_2$ of the first cladding 112 is -0.0016-0 and the allowable tolerance is ±2.0%. The thickness b of the first cladding 112 is among 0.5-2.3 μm and the allowable tolerance is ±2.0%. The second cladding 113 is a pure $SiO_2$ layer with the zero refractive index difference. The thickness c of the second cladding 113 can be appropriately adjusted by polishing and other measures after the completion of the perform manufacturing. Therefore, it does not have any effect on the qualification of the product. The diameter of the bare glass fiber 11 is among 124.0-126.0 μm. The thickness of the first resin protective layer 12 is about 38 μm; the Young's modulus is 1.1 MPa and the elastic modulus is 1.6 MPa. The thickness of the second resin protective layer 13 is about 22 μm; the Young's modulus is 700 MPa and the elastic modulus is 1200 MPa. The diameter of the finished fiber is controlled as 242±7 μm. The refractive index difference $\Delta_1$ of the core layer 111 and the refractive index difference $\Delta_2$ of the first cladding 112 are calculated respectively according to the following formula:

$$\Delta_1 = \frac{n1 - n2}{n1} \times 100\% \quad (2)$$

$$\Delta_2 = \frac{n2 - n0}{n2} \times 100\% \quad (3)$$

In the formula, n0 refers to the refractive index of the pure $SiO_2$; n1 refers to the refractive index of the core layer and n2 refers to the refractive index of the first cladding.

Figure 3:
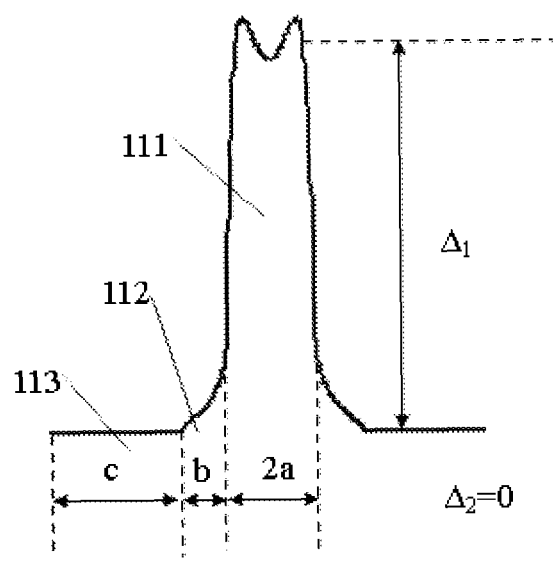
FIG. 3 is another structure diagram of the refractive index profile of the bare glass fiber (11) in FIG. 1.

As shown in FIGS. 2 and 3, the single mode fiber of the invention has the unique refractive index profile. The refractive index profile of the core layer 111 follows a power function. The power exponent of the distributed power function of the refractive index profile of the area near the center part of the fiber and near the first cladding part is 3~5 and −9~−8 respectively. The first cladding 112 can have certain refractive index dip or no refractive index dip (the refractive index dip reflecting on the refractive index profile is as the curve with a dip shape in FIG. 2). When there is the refractive index dip, a ladder-type distribution is provided. The second cladding 113 follows a ladder-type distribution.

The curve of relationship between the structure and performance of the fiber is as shown in FIG. 4-16.

Figure 4:
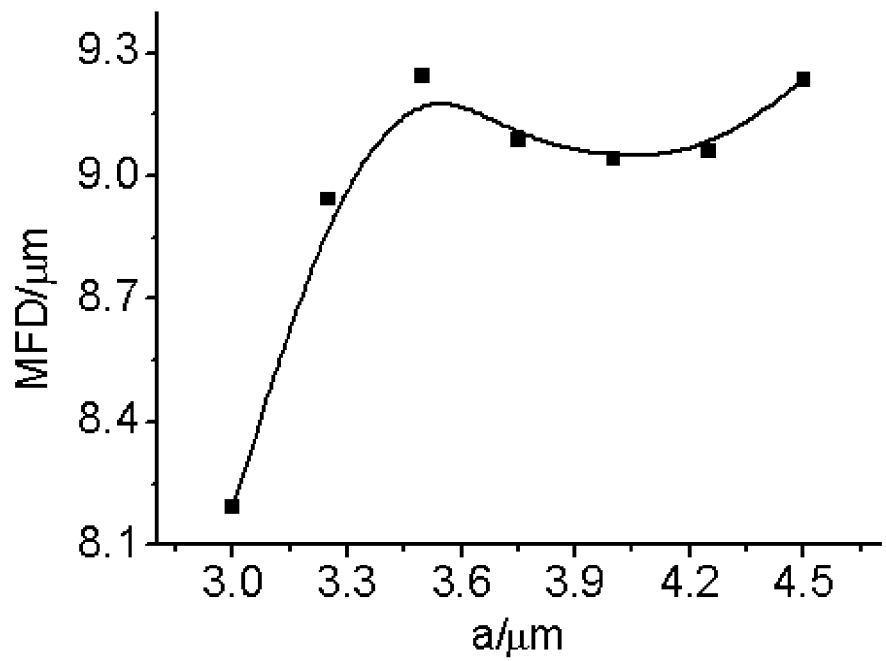
FIG. 4 is the curve of relationship between the thickness (a) of the core layer and the mode field diameter (MFD) of the fiber in the invention.

The curve shown in FIG. 4 is irregular and shows the change trend that the mode field diameter (MFD) of the single mode fiber of the invention increases firstly and then decreases, and increases again later with the increase of the thickness of the fiber core layer a.

Figure 5:
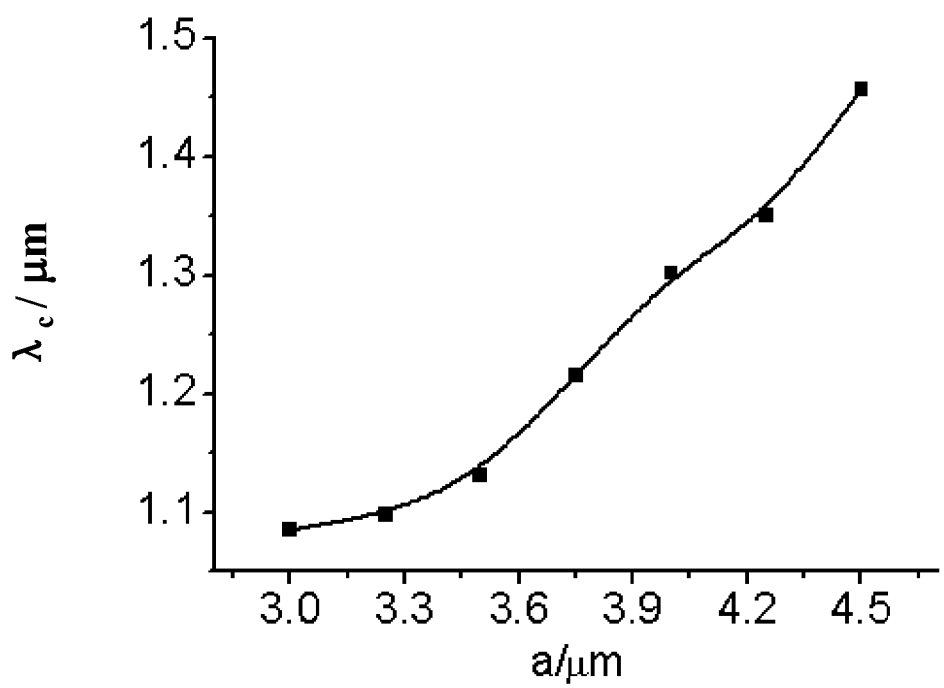
FIG. 5 is the curve of relationship between the thickness (a) of the core layer and the cutoff wavelength ($\lambda_c$) of the fiber in the invention.

The curve shown in FIG. 5 follows a approximate power function distribution, and shows the relationship that the cutoff wavelength $\lambda_c$ of the single mode fiber of the invention continues to increase with the increase of the thickness of the fiber core layer a.

Figure 6:
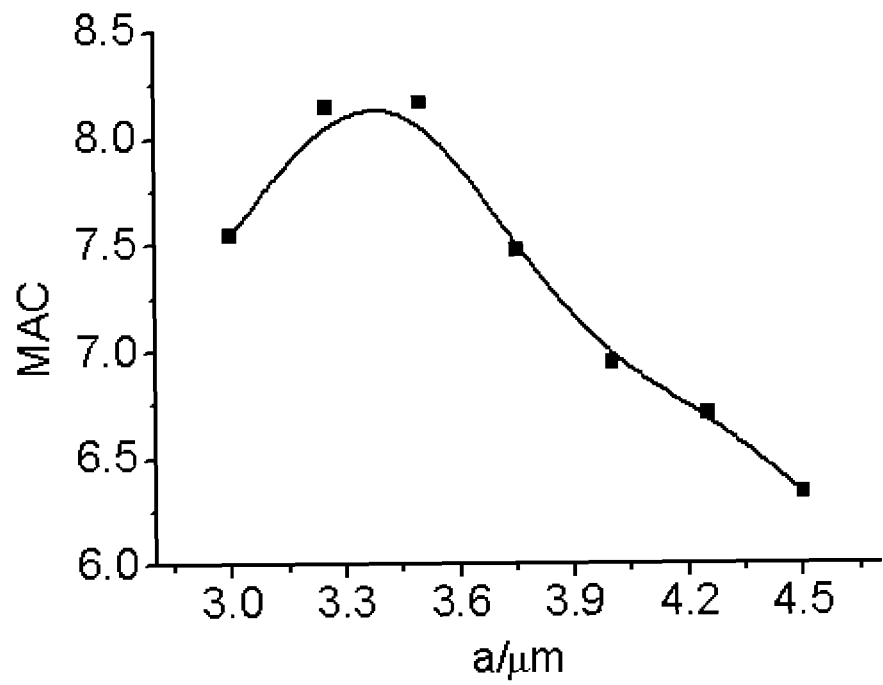
FIG. 6 is the curve of relationship between the thickness (a) of the core layer and the MAC value of the fiber in the invention.

The curve shown in FIG. 6 follows an approximate parabola distribution and shows the relationship that the MAC value of the single mode fiber of the invention increases firstly and then decreases with the increase of the thickness of the fiber core layer a.

Figure 7:
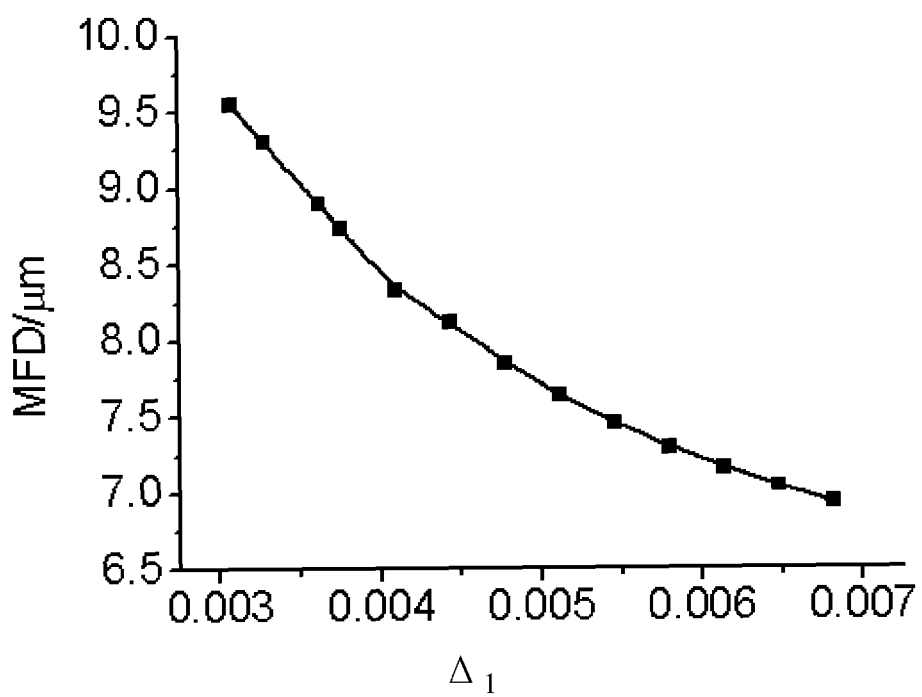
FIG. 7 is the curve of relationship between the refractive index difference ($\Delta_1$) of the core layer and the mode field diameter (MFD) of the fiber in the invention.

The curve shown in FIG. 7 follows an approximate logarithm function distribution and shows the relationship that the mode field diameter MFD of the single mode fiber of the invention continues to decrease with the increase of the refractive index difference $\Delta_1$ of the fiber core layer.

Figure 8:
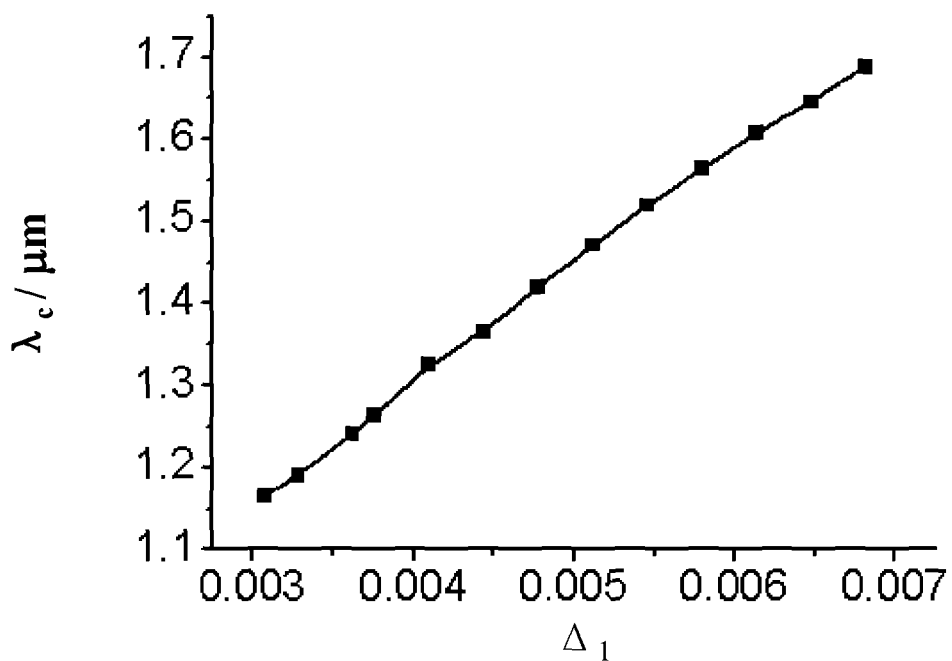
FIG. 8 is the curve of relationship between the refractive index difference ($\Delta_1$) of the core layer and the cutoff wavelength ($\lambda_c$) of the fiber in the invention.

The curve shown in FIG. 8 is an approximately straight line and shows the relationship that the cutoff wavelength $\lambda_c$ of the single mode fiber of the invention continues to increase with the increase of the refractive index difference $\Delta_1$ of the fiber core layer.

Figure 9:
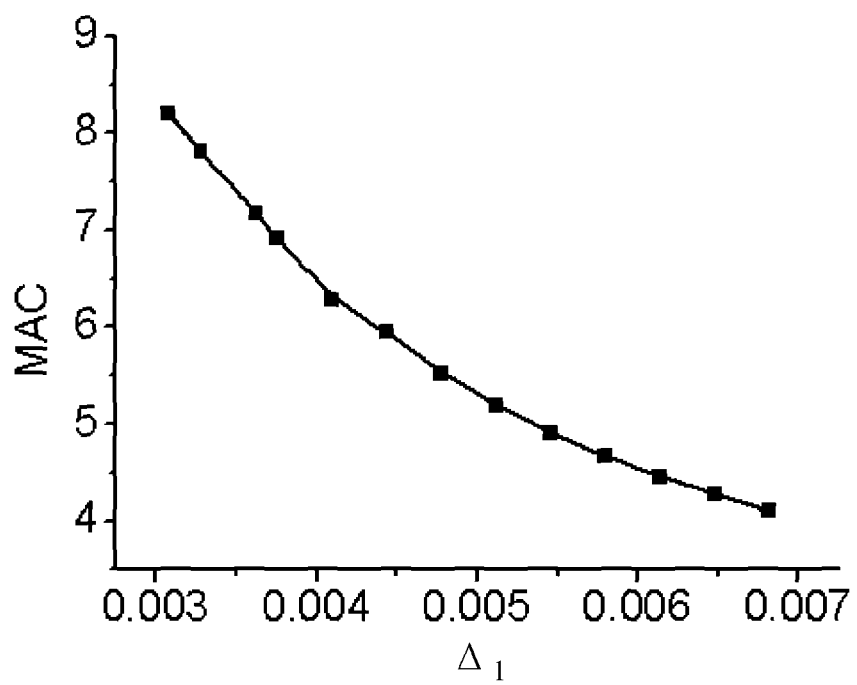
FIG. 9 is the curve of relationship between the refractive index difference ($\Delta_1$) of the core layer and the MAC value of the fiber in the invention.

The curve shown in FIG. 9 follows an approximate logarithm function distribution and shows the relationship that the MAC value of the single mode fiber of the invention continues to decrease with the increase of the refractive index difference $\Delta_1$ of the fiber core layer.

Figure 10:
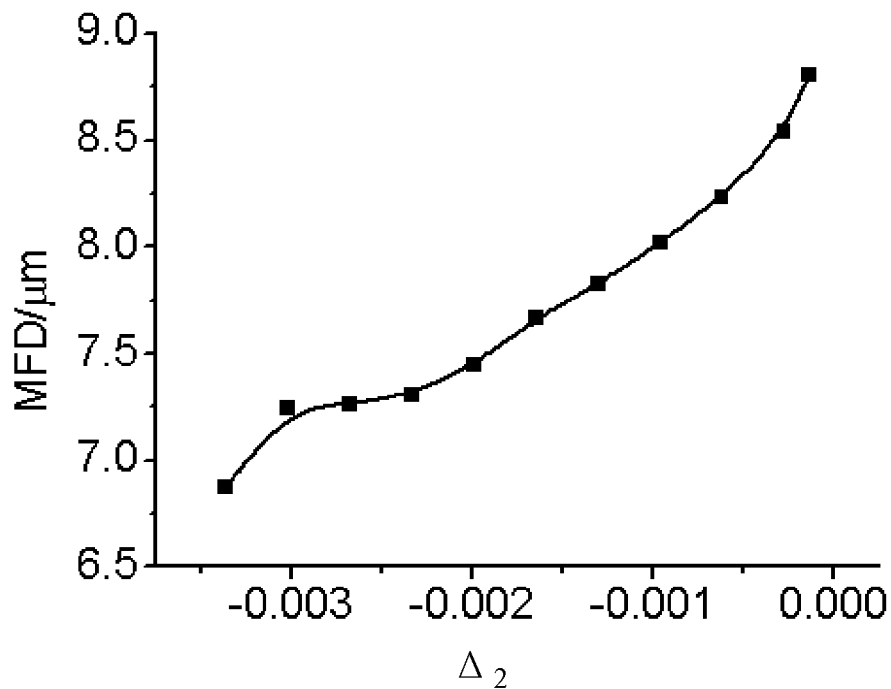
FIG. 10 is the curve of relationship between the refractive index difference ($\Delta_2$) of the first cladding and the mode field diameter (MFD) of the fiber in the invention.

The curve shown in FIG. 10 is irregular and shows the relationship that the mode field diameter MFD of the single mode fiber of the invention continues to increase with the increase of the refractive index difference $\Delta_2$ of the first cladding.

Figure 11:
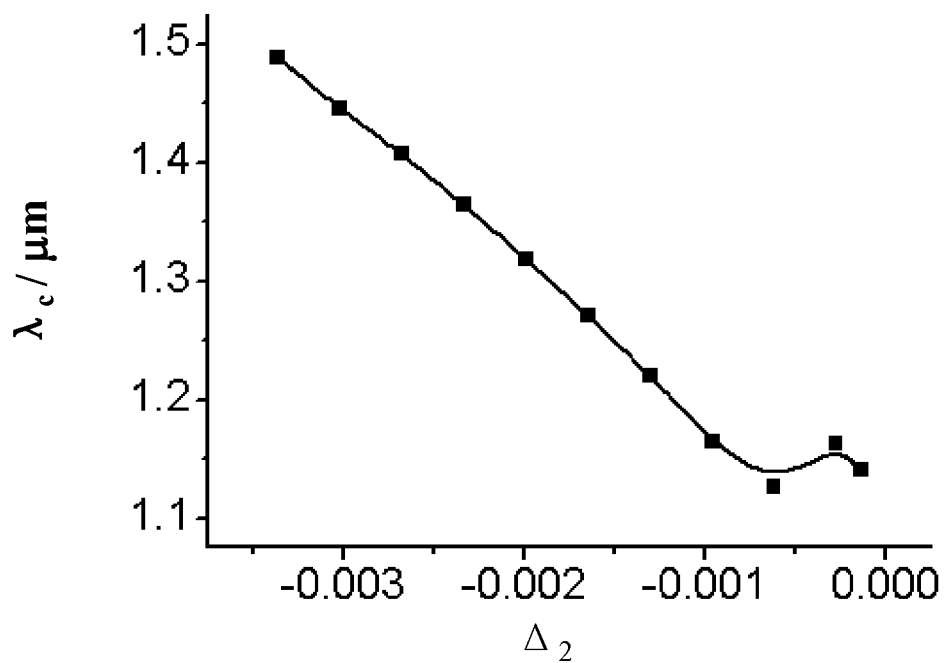
FIG. 11 is the curve of relationship between the refractive index difference ($\Delta_2$) of the first cladding and the cutoff wavelength ($\lambda_c$) of the fiber in the invention.

The curve shown in FIG. 11 is irregular and shows the relationship that the cutoff wavelength $\lambda_c$ of the single mode fiber of the invention continues to decrease with the increase of the refractive index difference $\Delta_2$ of the first cladding, and when $\Delta_2$ is less than −0.001, the relationship is basically a linear.

Figure 12:
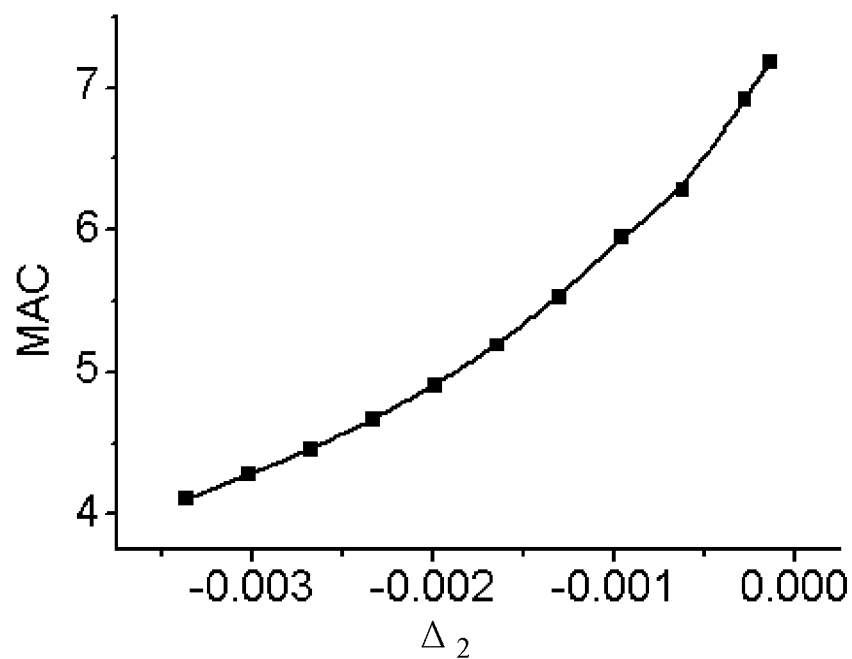
FIG. 12 is the curve of relationship between the refractive index difference ($\Delta_2$) of the first cladding and the MAC value of the fiber in the invention.

The curve shown in FIG. 12 follows a power function distribution and shows the relationship that the MAC value of the single mode fiber of the invention continues to increase with the increase of the refractive index difference $\Delta_2$ of the first cladding.

Figure 13:
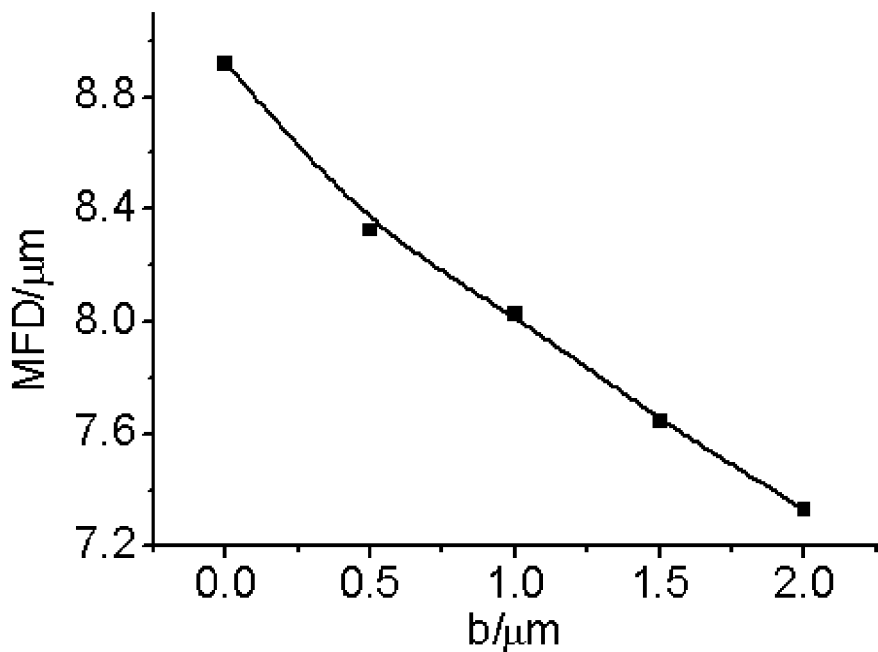
FIG. 13 is the curve of relationship between the thickness (b) of the first cladding and the mode field diameter (MFD) of the fiber in the invention.

The curve shown in FIG. 13 is an approximately straight line and shows the relationship that the mode field diameter MFD of the single mode fiber of the invention continues to decrease with the increase of the thickness of the first cladding b.

Figure 14:
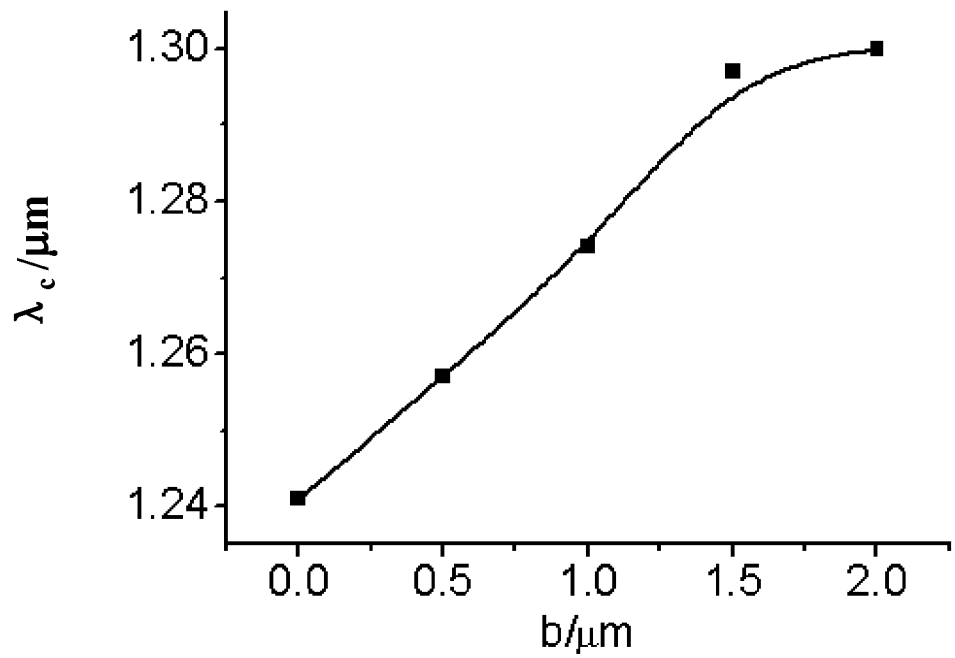
FIG. 14 is the curve of relationship between the thickness (b) of the first cladding and the cutoff wavelength ($\lambda_c$) of the fiber in the invention.

The curve shown in FIG. 14 is an approximately straight line and shows the relationship that the cutoff wavelength $\lambda_c$ of the single mode fiber of the invention continues to increase with the increase of the thickness of the first cladding b.

Figure 15:
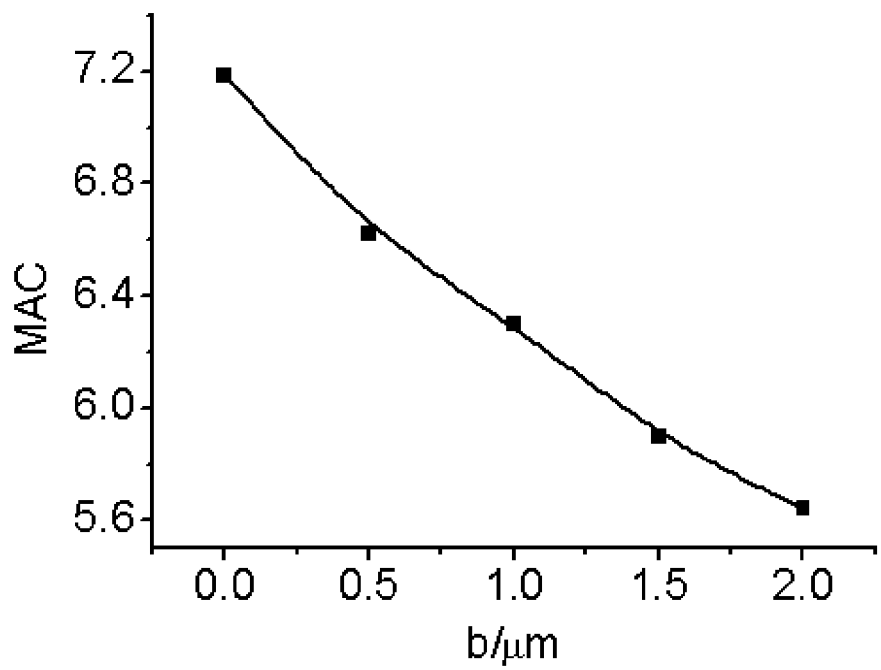
FIG. 15 is the curve of relationship between the thickness (b) of the first cladding and the MAC value of the fiber in the invention.

The curve shown in FIG. 15 is an approximately straight line and shows the relationship that the MAC value of the single mode fiber of the invention continues to decrease with the increase of the thickness of the first cladding b.

Figure 16:
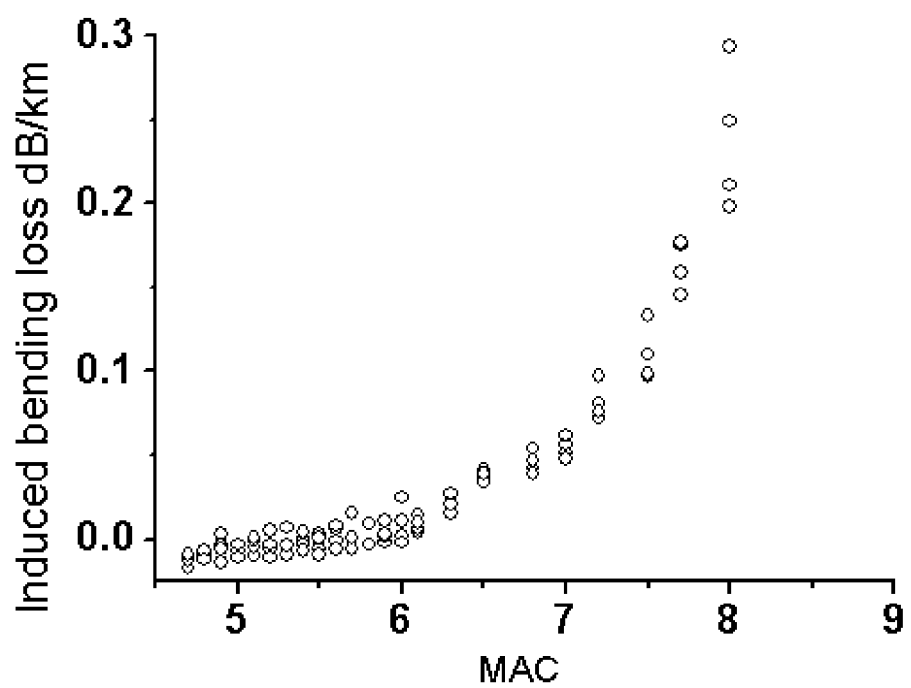
FIG. 16 is the curve of relationship between the MAC value and the bending loss at 1550 nm of the fiber in the invention when measured by winding one turn with the radius of 10 mm.

The distribution diagram shown in FIG. 16 is continuously rising and shows the relationship that the bending loss of the single mode fiber of the invention continues to increase with the increase of the MAC.

Embodiment 1

Use the process of the VAD technology to manufacture the core rod and the OVD (or RIC) technology to manufacture the cladding so as to produce the fiber perform. During the deposition of the core layer 111, a certain quantity of $GeCl_4$ is doped into the raw material of $SiCl_4$ so that the refractive index difference of the core layer $\Delta_1$ is 0.0038 at 632.8 nm. During the deposition of the first cladding 112 and part of the second cladding 113, the pure $SiCl_4$ raw material is used. By controlling the burner flow and the deposition time, the thickness of each layer shall be controlled as follows: the thickness of the core layer 111, first cladding 112 and second cladding 113 are 3.72 μm, 1.10 μm and 57.76 μm respectively. By controlling the drawing speed, the dripper temperature, etc, the diameter of the bare glass fiber shall be controlled as 125.15 μm; the thicknesses of the coating resins of the first resin protective layer 12 and the second resin protective layer 13 are respectively 37.4 μm and 21.8 μm; the diameter of the final finished fiber is 243.55 μm. By controlling the resin and the curing condition, the Young's moduli of the first resin protective layer 12 and the second resin protective layer 13 are respectively about 1.1 MPa and 1.6 MPa and the elastic moduli are respectively 700 MPa and 1200 MPa. The performance of the fiber of the embodiment are as follows: the zero dispersion wavelength $\lambda_0$ is 1.313 μm; the cutoff wavelength $\lambda_c$ is 1.228 μm; dispersion slope coefficient $S_0$ is 0.0878 ps/nm²/km; the mode field diameter at 1319 nm is 8.55 μm; in the wavelength range of 1288 nm-1339 nm, the absolute maximum of the dispersion coefficient is 2.29 ps/nm/km; in the wavelength range of 1271 nm~1360 nm, the absolute maximum of the dispersion coefficient is 3.89 ps/nm/km; the MAC value, the bending insensitive loss characteristic reference, is 6.96 at the wavelength 1310 nm; when measured by winding ten turns with 15 mm of the radius, the macrobending loss is 0.08 dB at the wavelength 1550 nm and the loss is 0.017 dB at the wavelength 1625 nm; when measured by winding one turn with 10 mm of the radius, the macrobending loss is less than 0.021 dB at the wavelength 1550 nm and the loss is 0.05 dB at the wavelength 1625 nm. The fiber of the this embodiment meets the fiber standard of ITU.T G.657.A, the mode field diameter of which is equivalent to the fiber of G.652 series and can be well compatible with the existed transmission networks and can be used in the transmission system of the Fiber To The Home and other local area networks.

Embodiment 2

Use the process of the VAD technology to manufacture the core rod and the OVD (or RIC) technology to manufacture the outer cladding so as to produce the fiber perform. When in the deposition of the core layer 111, a certain quantity of $GeCl_4$ is doped into the raw material of $SiCl_4$ so that the refractive index difference of the core layer $\Delta_1$ is 0.0065 at 632.8 nm. When in the deposition of the first cladding 112, a certain quantity of $CF_4$ is doped into the raw material of $SiCl_4$ so that the refractive index difference $\Delta_2$ of the layer 112 is −0.0009 at 632.8 nm. During the deposition of the second cladding 113, the pure $SiCl_4$ raw material is used. By controlling the burner flow and the deposition time, the thickness of each layer shall be controlled as follows: the thickness of the core layer 111, first cladding 112 and second cladding 113 are 2.96 μm, 1.69 μm and 57.87 μm. By controlling the drawing speed, the dripper temperature, etc, the diameter of the bare glass fiber shall be controlled as 125.03 μm; the thicknesses of the coating resins of the first coating layer 12 and second coating layer 13 are respectively 36.1 μm and 23.8 μm; the diameter of the final finished fiber is 245.02 μm. By controlling the resin and the curing condition, the Young's moduli of the first resin protective layer 12 and second resin protective layer 13 are respectively about 1.1 MPa and 1.6 MPa and the elastic moduli are respectively 700 MPa and 1200 MPa. The performance of the fiber in the embodiment are as follows: the cutoff wavelength $\lambda_c$ is 1.248 μm; the mode field diameter at the 1310 nm wavelength is 6.71 μm; the MAC value, the bending insensitive loss characteristic reference, is 5.37 at the wavelength 1310 nm; the attenuation coefficients at the wavelengths of 1310 nm, 1550 nm or 1625 nm are 0.368 dB/km, 0.205 dB/km and 0.209 dB/km respectively; the attenuation discontinuities at the wavelengths of 1310 nm and 1550 nm are both 0.01 dB/km; when measured by winding ten turns with 15 mm of the radius, the macrobending loss is 0.002 dB at the wavelength 1550 nm and the loss is 0.015 dB at the wavelength 1625 nm; when measured by winding one turn with 10 mm of the radius, the macrobending loss is less than 0.002 dB at the wavelength 1550 nm and the loss is 0.013 dB at the wavelength 1625 nm; when measured by winding one turn with 7.5 mm of the radius, the macrobending loss is less than 0.004 dB at the wavelength 1550 nm and the loss is 0.013 dB at the wavelength 1625 nm. The fiber in the embodiment meets the fiber standard of ITU.T G.657.B, which possess a smaller mode field diameter and better bending insensitive performance. The fiber is especially suitable to the transmission system of the FTTX (Fiber To The Home, Fiber To The Building, Fiber To The Roadside) and other access network.

It needs to be especially noted that the methods of the above embodiment are only limited to describe the embodiment. But the invention is not only limited to the above methods. According to this, the technical personnel in this field can modify with convenience without exceeding the scope of the invention. Therefore, the scope of the invention shall include the maximum scope of the principles and new features disclosed in the invention.

What is claimed is:

1. A bend insensitive single mode comprising:
a bare glass fiber (11) with a round cross section and two resin protective layers (12, 13) with circular cross sections surrounding the outer of the bare glass fiber (11); wherein
the bare glass fiber (11) is composed by a core layer (111) with a round cross section and two claddings (112, 113) with circular cross sections,
a refractive index of the core layer (111) is higher than refractive indexes of the two claddings (112, 113);
a refractive index difference ($\Delta_1$) between the core layer (111) and the first cladding (112) $\Delta_1$ is between 0.0033~0.0072, a refractive index difference ($\Delta_2$) between the first cladding (112) and second (113) claddings $\Delta_2$ is between −0.0016~0, a thickness (a) of the core layer (111) is between 2.7~4.1 μm, a thickness (b) of the first cladding (112) is between 0.5~2.3 μm and a thickness (c) of the second cladding (113) is between 56.7~59.8 μm; and
the second cladding (113) is made of pure $SiO_2$, a refractive index profile of the core layer (111) follows a power function distribution, and the refractive index profiles of the two claddings (112 and 113) follow a ladder-type distribution.

2. The bend insensitive single mode fiber according to claim 1, wherein a diameter of the bare glass fiber (11) is between 124.3~125.7 μm, for the first resin protective layer (12), a thickness is 38±1 μm, Young's modulus is 1.1±0.1 MPa; for the second resin protective layer (13), a thickness is 22±1 μm, Young's modulus is 700±50 MPa; a diameter of the bare glass fiber is 125±1 μm and total diameter of the fiber is 242±7 μm.

3. The bend insensitive single mode fiber according to claim 1, wherein power exponents of distributed power function of refractive index profile of the core layer (111) near a center part and near the first cladding (112) part are 3~5 and −9~−8 respectively.

4. The bend insensitive single mode fiber according to claim 1, wherein the refractive index difference ($\Delta_1$) of the core layer (111) and the first cladding (112) is between 0.0058~0.0072; the refractive index difference ($\Delta_2$) of the first (112) and second (113) claddings is between −0.0016~−0.0008; a thickness (a) of the core layer (111) is between 2.8~3.2 μm, a thickness (b) of the first cladding (112) is between 0.8~2.1 μm and a thickness (c) of the second cladding (113) is between 57.1~58.9 μm; a diameter of the bare glass fiber is 125±1 μm and the outer diameter of the fiber is 242±7 μm.

5. The bend insensitive single mode fiber according to claim 4, wherein a mode field diameter (MFD) is 6.5±0.5 μm at 1310 nm and a cutoff wavelength ($\lambda_c$) is between 1180~1330 nm; when measured by winding ten turns with a radius of 15 mm, a macro-bending loss of the fiber is less than 0.03 dB at 1550 nm and a macro-bending loss is less than 0.1 dB at 1625 nm; when measured by winding one turn with a radius of 10 mm, a macro-bending loss of the fiber is less than 0.1 dB at 1550 nm and a macro-bending loss is less than 0.2 dB at 1625 nm; when measured by winding one turn with the radius of 7.5 mm, a macro-bending loss of the fiber is less than 0.5 dB at 1550 nm and a macro-bending loss is less than 1.0 dB at 1625 nm.

* * * * *